United States Patent [19]

Hahn et al.

[11] Patent Number: 4,605,353

[45] Date of Patent: Aug. 12, 1986

[54] VEHICLE RESTRAINT

[75] Inventors: Norbert Hahn, South Milwaukee, Wis.; Arthur A. Olson, Jr., Glenview, Ill.

[73] Assignee: Rite-Hite Corporation, Milwaukee, Wis.

[21] Appl. No.: 526,090

[22] Filed: Aug. 24, 1983

[51] Int. Cl.[4] .......................... B60D 1/00; B65G 67/02
[52] U.S. Cl. ................................ 414/401; 52/173 R; 52/173 DS; 292/110; 16/295; 16/361
[58] Field of Search ............... 52/173 DS, 173 R, 40, 52/27, 37; 292/109, 114, 121, 110, 122, 219, 220; 16/366, 360, 361, 294, 295; 414/584, 401, 396

[56] References Cited

U.S. PATENT DOCUMENTS

| 682,645 | 9/1901 | Schaefer | 292/109 |
| 1,178,966 | 4/1916 | Swearingen | 292/121 |
| 1,369,699 | 2/1921 | Myers | 292/109 |
| 2,295,360 | 8/1942 | Schneider | 292/114 |
| 3,612,287 | 10/1971 | Maltese | 52/40 |
| 3,857,575 | 12/1974 | Lee | 52/40 |
| 3,871,134 | 3/1975 | Lening | 292/114 |
| 4,208,161 | 6/1980 | Hipp et al. | 414/401 |
| 4,373,847 | 2/1983 | Hipp et al. | 414/401 |

FOREIGN PATENT DOCUMENTS 98364  7/1961  Norway .......................... 292/109

Primary Examiner—Carl D. Friedman
Assistant Examiner—Michael Safavi
Attorney, Agent, or Firm—Neuman, Williams, Anderson & Olson

[57] ABSTRACT

A mechanical restraint is provided for use in securing a parked vehicle to a stationary structure, such as a loading dock, while the vehicle is being loaded or unloaded. The restraint includes a first member fixedly mounted on the front wall of the loading dock, and a second member mounted on the first member for movement in a vertical plane and for hinged movement about a vertical axis between operative and inoperative modes. The second member is provided with an elongated first section which is in sliding engagement with the first member. The second member, when in a raised position is adapted to turn about the longitudinal axis of the first section which is coaxial with the hinge axis of the second member. The second member is provided with an elongated second section which projects angularly from the upper end portion of the first section. The second section includes a distal end portion provided with a depending projection. When the second member is in the operative mode, the distal end portion is adapted to overlie and interlock with a transverse bar, such as an ICC bar, which depends from the rear portion of the parked vehicle. The second section of the second member includes a safety element which effects separation of the first and second members only when an external pulling force above a predetermined amount is exerted on the distal end portion of the second section.

5 Claims, 9 Drawing Figures

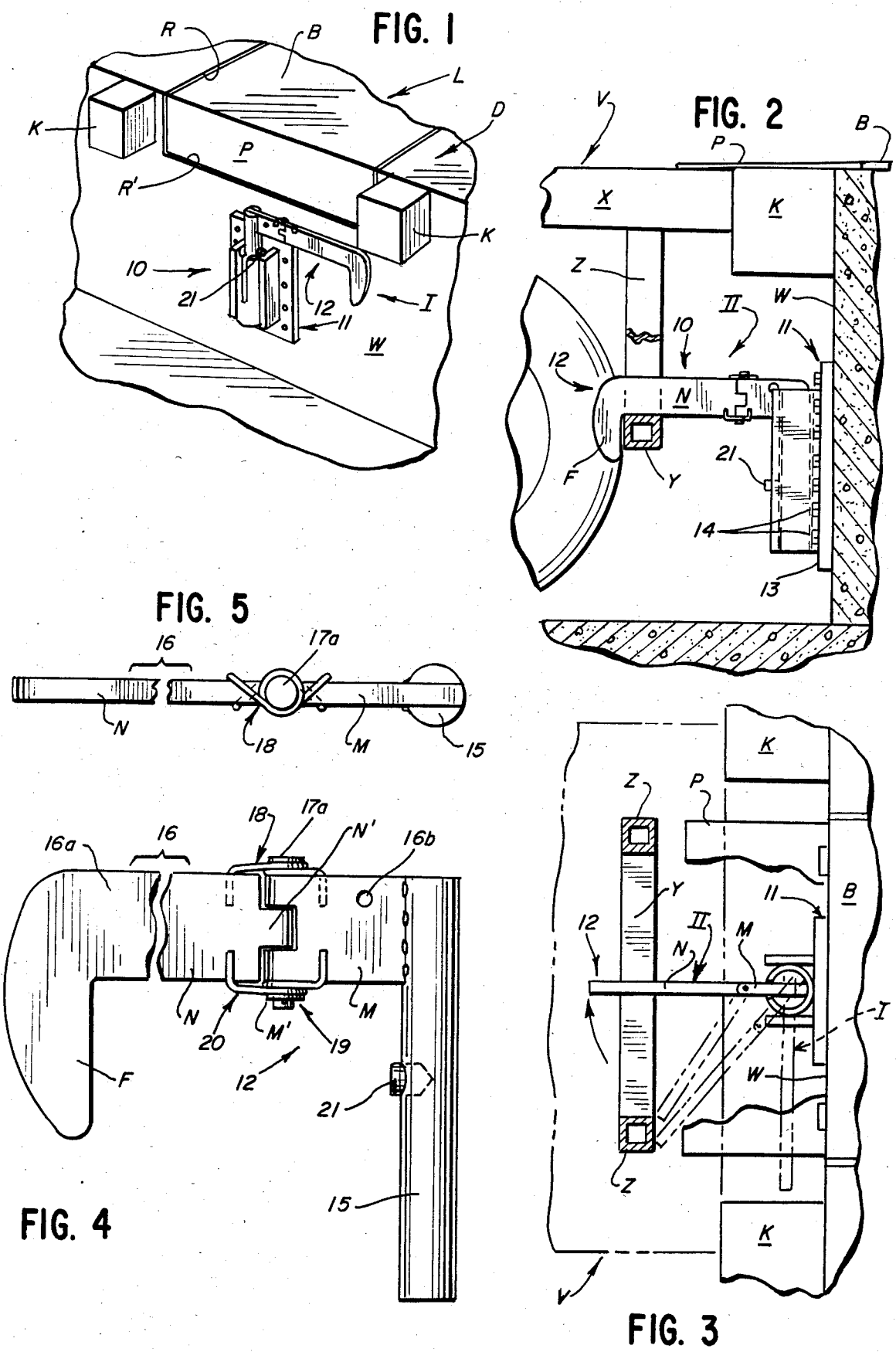

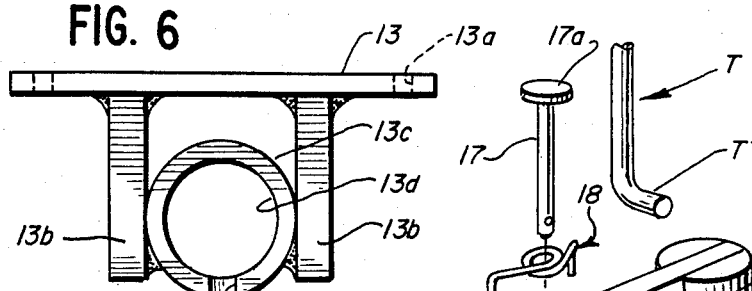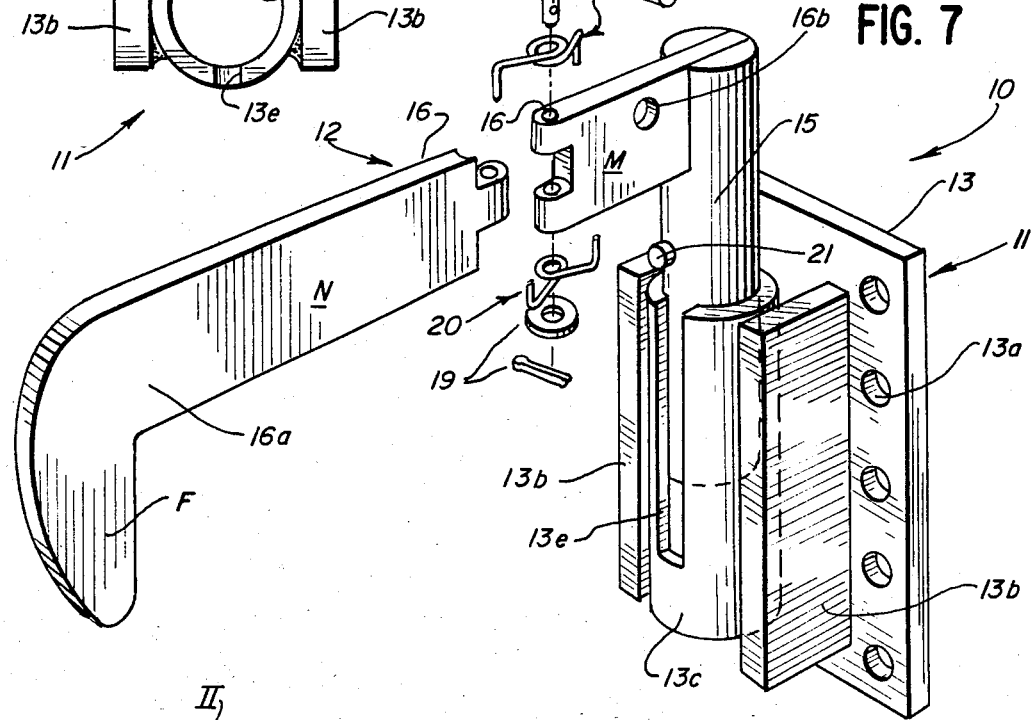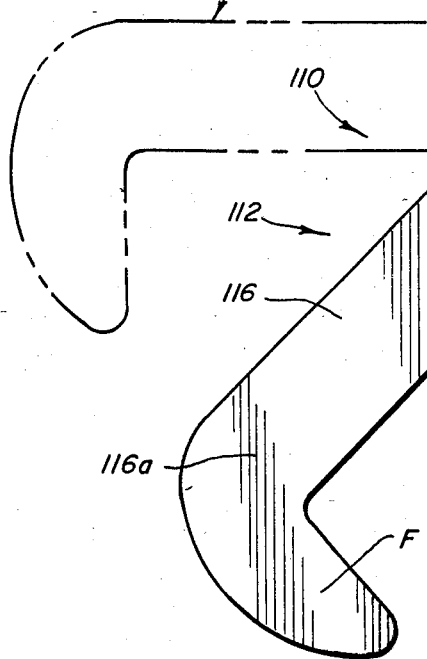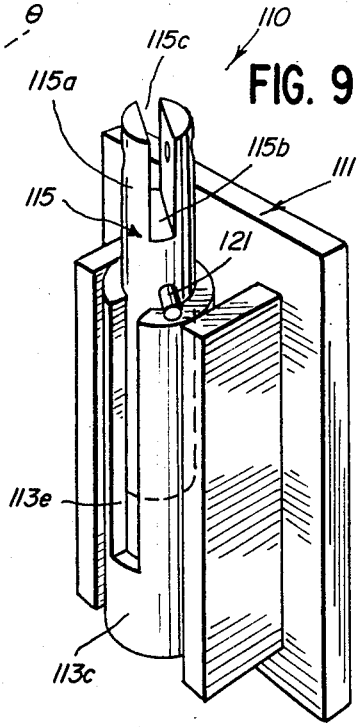

VEHICLE RESTRAINT

BACKGROUND OF THE INVENTION

In loading and unloading of a truck parked at a conventional loading dock, it is essential from a safety standpoint that the truck be effectively secured in place against the front wall of the dock so as to prevent accidental movement of the truck away from the dock while mechanical devices, such as dollies, fork lift trucks and the like, are moving between the parked truck and the loading dock platform.

Heretofore to effect securement in place of the parked vehicle, various methods have been utilized, such as (a) chocking the rear wheels of the parked vehicle; (b) chaining the rear end of the vehicle to a stanchion or ring provided on the dock; or (c) engaging a mechanical restraint, such as a hook mounted on a dock front wall with an ICC bar required to be carried on the underside of the vehicle. The ineffectiveness and shortcomings of these approaches are well known. In chocking, for example, the securement depends upon the driver or dock personnel exercising care and patience in inspecting and clearing the driveway surface adjacent the dock of ice, snow, oil or debris so that the chocks can be properly positioned without slippage against the rear wheels of the parked vehicle. Where chaining is involved, it is imperative that the chain or cable connecting the vehicle to the dock be made taut. Because of the inordinate amount of time and labor involved in performing such chaining this method is not widely adopted.

Prior mechanical restraints, on the other hand, while in many instances overcome the aforenoted problems associated with chocking and chaining, they are nevertheless oftentimes beset with one or more equally serious short-comings, such as: (a) they are of a costly, complex and bulky construction; (b) they require substantial structural modifications and changes to be made to the dock itself; (c) they require an electrical, hydraulic and/or pneumatic power source; (d) they require an inordinate amount of servicing and maintenance; and (e) they are incapable of properly accommodating a wide variety of ICC bars.

SUMMARY OF THE INVENTION

Thus, it is an object of the invention to provide a vehicle restraint which effectively overcomes the aforenoted shortcomings associated with prior devices and methods.

It is a further object to provide a vehicle restraint which is effective in operation and embodies a safety feature which avoids the restraint or the dock from incurring permanent damage in the event an excessive pulling force is exerted on the restraint.

It is a still further object to provide a vehicle restraint which may be readily utilized in conjunction with various types of dock levelers and associated equipment.

Further and additional objects will appear from the description, accompanying drawings and appended claims.

In accordance with one embodiment of the invention, a vehicle restraint is provided for releasably securing a parked vehicle against a loading dock or the like. The parked vehicle is provided with a conventional depending ICC bar which is disposed in proximity to the exposed front wall of the loading dock. The vehicle restraint includes a first member fixedly secured to the dock front wall and a second member mounted on the first member for movement in a vertical plane and for hinged movement about a vertical axis between operative and inoperative modes. The second member is provided with an elongated first section which is in sliding engagement with the first member. The first section, when in predetermined relative positions of sliding adjustment, is adapted to be turned about its longitudinal axis, the latter being coaxial with the hinge axis of the second member. Projecting angularly from the upper end of the first section is a second section having a distal end portion provided with a depending projection. When the second member is in an operative mode, the distal end portion is adapted to overlie and interlock with the vehicle ICC bar. The second section includes a safety means which effects separation of the first and second sections, when an external pulling force in excess of a predetermined amount, is exerted on the distal end portion of the second section.

DESCRIPTION

For a more complete understanding of the invention reference should be made to the drawings wherein:

FIG. 1 is a fragmentary perspective view of a preferred embodiment of the improved vehicle restraint shown mounted on the exposed front wall of a conventional loading dock and in an inoperative mode.

FIG. 2 is an enlarged, fragmentary, vertical sectional view showing the restraint of FIG. 1 in an operative mode and interlockingly engaging the ICC bar of a parked vehicle.

FIG. 3 is a fragmentary top plan view of the restraint shown in FIG. 2; the second member of the restraint being shown in phantom lines in various positions while being moved from the inoperative mode to the operative mode.

FIG. 4 is an enlarged side elevational view of the second member per se of the restraint shown in FIG. 1.

FIG. 5 is a fragmentary top plan view of the second member shown in FIG. 4.

FIG. 6 is an enlarged top plan view of the first member per se of the restraint shown in FIG. 1.

FIG. 7 is an enlarged, fragmentary, perspective view of the restraint of FIG. 4 and showing certain components thereof in exploded relation.

FIG. 8 is an enlarged side elevational view of a modified form of the improved vehicle restraint and showing in full lines the second section of the second member in a depending inoperative position and in phantom lines showing said second section in an operative position.

FIG. 9 is an enlarged perspective view of the restraint of FIG. 8 with the second section thereof removed.

Referring now to the drawings and more particularly to FIGS. 1-3, a preferred embodiment of the improved vehicle restraint 10 is shown mounted on the exposed front wall of a conventional loading dock D. The dock, as illustrated, includes a dock leveler L having an outwardly pivoting lip panel P hinged to the exposed front edge of a dockboard or deck B, the latter forming a component of the leveler L. Spaced laterally from opposite ends of panel P and secured to the dock wall W are a pair of outwardly projecting bumpers K. The dock leveler L is normally positioned within a suitable pit or recess R formed in the upper and front surfaces of the dock. The dock leveler, lip panel P, and the bumpers are of conventional design and form no part of the invention herein disclosed and claimed.

Restraint 10, as illustrated, includes a bracket or first member 11 which is normally centered between the bumpers K and is bolted or otherwise secured to the dock wall W beneath the portion R' of pit R which extends into the front wall W, see FIG. 1. Accommodated within the bracket 11 is a vehicle attaching unit or second member 12 which is adapted to be manually manipulated between inoperative and operative modes, I and II, respectively.

Bracket 11, as seen more clearly in FIGS. 6 and 7, includes a mounting plate 13 having the backside thereof in face-to-face contact with the dock wall W. Suitable bolt-receiving openings 13a are formed along the periphery of plate 13 and are adapted to accommodate the shanks of conventional anchor bolts 14. Fixedly mounted on the frontside of plate 13 and projecting outwardly therefrom is a pair of spaced, parallel flanges 13b. Disposed between the flanges and fixedly mounted thereto is a sleeve element 13c having the bore 13d thereof sized to snugly, yet slidably, accommodate a section of the attaching unit 12 as will be described more fully hereinafter. The exposed frontside of the sleeve element 13c is provided with an elongated, longitudinally extending guide slot 13e, the function of which will become apparent from the description to follow.

The vehicle attaching unit 12, as seen more clearly in FIGS. 4 and 7, includes an elongated first section 15, which in the illustrated embodiment, is in the form of a cylindrical shaft, having an outside diameter which is close to the diameter of bore 13d formed in sleeve 13c. The shaft 15 maintains a sliding fit within the bore, so that the unit 12 can be manually raised relative to sleeve 13c when the unit is being moved into or out of interlocking relation with the ICC bar Y provided on the underside of the bed X of the parked vehicle V, see FIG. 2, as will be explained more fully hereinafter.

Fixedly connected to the exposed upper end portion of shaft 15 is an elongated second section 16. The distal or free end portion 16a of section 16 is provided with a depending projection or finger F. In the preferred embodiment, section 16 includes an inner segment M and an outer segment N. Corresponding ends of the segments are adapted to interfit with one another and are pivotally interconnected by a pintle 17, see FIG. 7. Pintle 17, in addition to effecting a pivotal interconnection between segments M and N, also serves as a safety means in that it will shear when a predetermined pulling force exceeding a predetermined amount (e.g., 18,000 lbs.) is exerted on the outer segment N. Thus, the shear strength of pintle 17 is set so that it will shear and effect separation of the segments before shaft 15 and the bracket 11 become damaged or distorted, or the bracket anchor bolts 14 are loosened, or the dock front wall W is damaged. While segment M is shown as having a bifurcated end M' and the corresponding end of segment N as having a single projection N', it is to be understood of course that the corresponding ends of the segments may take various other shapes if desired.

By reason of the second section 16 being formed of pivotally connected segments, manual movement of the unit 12 from the inoperative mode I to the operative mode II particularly, if the outer segment N was to encounter a vertically depending obstruction Z (e.g., one of the legs to which the ICC bar is connected), see FIG. 3, is greatly facilitated, because the outer segment N will yield in either a counterclockwise or clockwise direction relative to segment M a sufficient amount to allow the outer segment to move past or clear the obstruction and thus, enable the section 12 to properly assume the operative mode II. While the outer segment N is moving past the obstruction Z, the unit 12 is manually raised relative to the sleeve 13c, an amount sufficient to enable the depending finger F on the distal end portion 16a of the second section 16 to clear the ICC bar Y. Once the distal end portion 16a is disposed between the depending legs Z and substantially centered with respect to the bar Y, the unit 12 is permitted by the force of gravity to be lowered so that the end portion 16a will overlie the bar Y and the finger F will interlockingly engage behind said bar and thus, hold the parked vehicle V safely against the bumpers K mounted on the dock wall W.

The afore-described manipulation of the unit 12 may be readily accomplished by utilizing an elongated implement T having an offset lower end T'. The end T' is adapted to be inserted into an opening 16b formed in the inner segment M of the second section 16, see FIG. 7. The upper end of the implement, not shown, may be provided with a suitable cross handle. The implement T is manipulated by one of the loading dock personnel while standing near the outer edge of the leveler dockboard or deck B, and before the lip panel P has assumed an extended position as seen in FIG. 2. Once unit 12 is in interlocking engagement with bar Y, the dock personnel will then activate the leveler L so that the panel P will assume an extended position whereupon the latter will engage in overlying relation the upper surface of the vehicle bed X as the dockboard is pivoted into position. The movement sequence of the leveler dockboard and the lip panel P is well known in the art.

The inner and outer segments M, N of the second section 16 are resiliently retained in an aligned relation by torsion springs 18, 20 which are disposed respectively on the top and bottom surfaces of section 16, see FIG. 4. The springs may be of like construction and are held in place by an enlarged head 17a at one end of pintle 17 and a washer and cotter-pin assembly 19 at the opposite end of the pintle, see FIG. 7. Thus, regardless of whether the outer segment N yields in a clockwise or counter-clockwise direction with respect to inner segment M, the outer segment N will automatically resume an aligned relation with the inner segment M, once the outer segment has moved past the depending obstruction Z, see FIG. 3.

It will be noted in FIG. 3 that, when the second member 12 is disposed in an inoperative mode I shown in phantom lines in FIG. 3, the entire device 10 is recessed a substantial amount from a plane defined by the end faces of the bumpers K. Thus, when in mode I, all components of the device are in a protected position and are not subject to being accidently struck by the vehicle V when the latter is being backed into its parked position.

As shown in FIGS. 1, 4 and 7, the shaft 15 of the second member 12 is provided with an outwardly projecting nub 21 which is disposed in the same vertical plane as defined by the inner segment M of the second section 16. The nub is sized so that it will slidably fit within guide slot 13e of sleeve 13c and retain the second section 16 in a substantially perpendicular position with respect to the wall-mounted bracket 11, when the member 12 assumes the operative mode II. When the member 12 is raised sufficiently so that the nub 21 is disengaged from the slot 13e, the member 12 may be rotated by the implement T to inoperative mode I whereby the nub 21 will rest upon the upper edge of sleeve 13c, see FIG. 1.

FIGS. 8 and 9 show a second embodiment 110 of the improved restraint. Components of restraint 110 which correspond to those of restraint 10 will be identified by corresponding numbers except in the 100 series. The restraint 110 includes a first member 111 which in the illustrated embodiment is of the same configuration as member 11. A second member 112 is mounted on member 111 and is adapted to be manually raised and turned relative thereto as in the case of member 12. Member 112 includes an elongated cylindrical shaft or first section 115 which is in sliding engagement with the sleeve 113c forming a part of member 111. The upper end portion 115a of the shaft 115 is bifurcated and is adapted to pivotally accommodate the inner end of an elongated arm or second section 116. The bottom 115b of the slot 115c formed in the bifurcated end of the shaft is disposed at an angle θ of approximately 45° to the longitudinal axis of the shaft 115. The outer or distal end 116a of arm 116 is provided with a depending finger or projection F which is adapted to interlockingly engage the ICC bar Y of the parked vehicle, when the second member 112 is disposed in the operative mode II, shown in phantom lines in FIG. 8.

The pivotal connection between arm 116 and the bifurcated end 115a of shaft 115 is effected by a pintle 117 which extends through aligned openings formed in the inner end of arm 116 and the upper end of shaft 115. The pintle 117 is of such size and material that it will shear when a pulling force in excess of a predetermined amount (e.g., 18,000 lbs.) is exerted on the distal end 116a of arm 116. Thus, when pintle 117 is sheared, the arm 116 will separate from shaft 115 before the restraint 110 or the dock wall W incurs any permanent damage.

To facilitate manipulating of the arm 116 to the operative mode II and to raise the second member 112 relative to the first member 111, a suitable opening 116b is provided in arm 116 in close proximity to the pivot axis of the arm. The opening 116b is adapted to be engaged by the offset end T' of the implement.

While the upper end 115a of the shaft 115 is shown to be bifurcated, it is to be understood of course that the inner end of the arm may be bifurcated and the upper end of the shaft formed into a narrow projection which will be accommodated in the bifurcated end of the arm.

When the second member 112 is disposed in an inoperative mode, the arm 116 assumes the downwardly pivoted position as shown in full lines in FIG. 8 and the shaft 115 is rotated about its longitudinal axis so that the nub 121 carried on the shaft will rest upon the upper edge of sleeve 113c. As in the case of restraint 10, it is necessary that nub 121 be disengaged from the slot 113e formed in sleeve 113c before the shaft can rotate about its longitudinal axis. By having the arm 116 disposed in its downwardly pivoted position, the incidence of the distal end of the arm encountering a depending obstruction on the underside of the parked vehicle when the member 112 is being moved from an inoperative mode I to an operative mode II is significantly reduced.

Thus, with either embodiment of the improved vehicle restraint 10, 110, the structure thereof is simple, inexpensive, and uncomplicated; does not require an electrical, pneumatic, or hydraulic source of power to operate; is simple to install; and does not interfere with the normal operation of a dock leveler, or other conventional accessory equipment utilized in a loading dock installation.

We claim:

1. A restraint for releasably securing a parked vehicle against an adjacent structure and preventing accidental transverse movement of the vehicle away from the structure, said restraint comprising a first means fixedly mountable on the structure, and a second means mounted on a segment of said first means for selective relative movement in a vertical plane and for selective relative pivotal movement about a vertical axis defined by said first means segment between operative and inoperative modes only when said second means assumes a predetermined elevated position with respect to the first means segment and a surface supporting and subtending the parked vehicle, said second means having an elongated downwardly extending first section in vertical sliding engagement with said first means segment and being adapted to turn about a longitudinal axis of said first section which is coaxial with said vertical axis, and an elongated second section projecting angularly from an upper end portion of said first section, said second section having a distal end portion provided with a depending projection, said distal end portion being adapted, when said second means is in an operative mode, to overlie and have the depending projecting thereof interlock with a transverse member depending from a portion of the parked vehicle adjacent the structure; said second section including releasable safety means effecting separation of said first section and at least a portion of said second section upon an external pulling force exceeding a predetermined amount being exerted on the depending projection of the distal end portion of said second section when said second means is in an operative mode; said second section also including inner and outer segments connected to one another for pivotal movement about a secondary axis parallel to and spaced from said vertical axis, said inner segment having one end thereof fixedly connected to the upper end portion of said first section, said outer segment including the depending projection of the distal end portion; the safety means including a shearable pintle effecting the pivotal connection between the inner and outer segments.

2. The restraint of claim 1 wherein the segment of said first means includes a first guide means and the first section of the second means includes a complemental second guide means, said first and second guide means coacting to substantially maintain said second means in an operative mode.

3. The restraint of claim 2 wherein the first guide means includes an elongated vertically extending slot formed in said first means segment, and the second guide means includes a fixedly mounted outwardly projecting nub, said nub being aligned with said slot, when said second means is in said operative mode, and being slidable within said slot to allow vertical adjustment of said second means while remaining in said operative mode.

4. The restraint of claim 1 wherein the safety means includes spring means coacting with the inner and outer segments of said second means second section to yieldably retain said segments in substantially aligned relation; said segments assuming an angular relation relative to one another upon a transverse non-vertical predetermined external force being exerted on the outer segment, while said second means is moving from an inoperative mode to an operative mode.

5. The restraint of claim 1 wherein the second section of the second means includes a first actuating means for operatively engaging a complemental second actuating means, said actuating means coacting with one another to effect selective vertical and hinged adjustment of the second means relative to said first means.

* * * * *

UNITED STATES PATENT AND TRADEMARK OFFICE
CERTIFICATE OF CORRECTION

PATENT NO. : 4,605,353
DATED : August 12, 1986
INVENTOR(S) : Norbert Hahn and Arthur A. Olson, Jr.

It is certified that error appears in the above-identified patent and that said Letters Patent is hereby corrected as shown below:

Column 6, line 20, the word "projecting" should be --projection--.

Signed and Sealed this

Eighteenth Day of November, 1986

Attest:

DONALD J. QUIGG

Attesting Officer
Commissioner of Patents and Trademarks